United States Patent [19]

Rausch

[11] 3,773,654

[45] Nov. 20, 1973

[54] HYDROTREATING OF HYDROCARBONS

[75] Inventor: Richard E. Rausch, Mundelein, Ill.

[73] Assignee: Universal Oil Products Company, Des Plaines, Ill.

[22] Filed: June 24, 1971

[21] Appl. No.: 156,473

Related U.S. Application Data

[60] Division of Ser. No. 827,181, May 23, 1969, abandoned, which is a continuation-in-part of Ser. No. 807,910, March 14, 1969.

[52] U.S. Cl.................... 208/57, 208/143, 208/217, 260/677 H
[51] Int. Cl............................................. C10g 23/04
[58] Field of Search.................... 208/143, 217, 264, 208/57; 260/667, 683.9, 674 N

[56] References Cited
UNITED STATES PATENTS

| | | | |
|---|---|---|---|
| 3,686,340 | 8/1972 | Patrick et al. | 208/143 |
| 3,580,837 | 5/1971 | Pollitzer | 208/57 |
| 2,861,959 | 11/1958 | Thorn et al. | 252/465 |
| 3,511,888 | 5/1970 | Jenkins | 260/673.5 |
| 3,531,543 | 9/1970 | Clippinger et al. | 252/466 PT |
| 2,426,870 | 9/1947 | Hill | 260/683.9 |
| 2,608,534 | 8/1952 | Fleck | 260/683.9 |
| 3,446,865 | 5/1969 | Roth et al. | 260/683.9 |
| 3,432,565 | 3/1969 | Kouwenhoven et al. | 208/143 |
| 3,489,778 | 1/1970 | Hof | 260/683.9 |

*Primary Examiner*—Herbert Levine
*Attorney*—James R. Hoatson, Jr. et al.

[57] ABSTRACT

A process for hydrotreating hydrocarbons and mixtures of hydrocarbons utilizing a catalytic composite of a porous carrier material, a Group VIII noble metal component and a tin component. Applicable to charge stocks containing sulfurous compounds and aromatic hydrocarbons, the operating conditions can be controlled to effect a particular end result including the ring-opening of cyclic hydrocarbons, desulfurization, denitrification, selective olefin saturation, etc.

1 Claim, No Drawings

HYDROTREATING OF HYDROCARBONS

RELATED APPLICATIONS

The present application is a Division of my copending application, Ser. No. 827,181, filed May 23, 1969 now abandoned, which, in turn, is a Continuation-In-Part of my copending application, Ser. No. 807,910, filed Mar. 14, 1969, all the teachings of which copending applications are incorporated herein by specific reference thereto. This application is filed to comply with a requirement for restriction in my copending application, Ser. No. 827,181.

APPLICABILITY OF INVENTION

The present invention encompasses the use of a catalytic composite of porous carrier material, a Group VIII noble metal component and tin component in the hydrotreating of hydrocarbons and mixtures of hydrocarbons. As utilized herein, the term "hydrotreating" is intended to be synonymous with the term "hydroprocessing," and involves the conversion of hydrocarbons at operating conditions selected to effect a chemical consumption of hydrogen. Included within the processes intended to be encompassed by the term "hydrotreating" are ring-opening of aromatic hydrocarbons, hydrorefining (for nitrogen removal and olefin saturation), desulfurization (often included in hydrorefining) and hydrogenation, etc. In essence, therefore, the present invention is directed toward the removal of various contaminating influences from a variety of hydrocarbonaceous charge stocks. As will be recognized, one common attribute of these processes, and the reactions being effected therein, is that they are all "hydrogen-consuming", and are, therefore, exothermic in nature.

The individual characteristics of the foregoing hydrotreating processes, including preferred operating conditions and techniques, will be hereinafter described in greater detail. The principal subject of the present invention is the use of a catalytic composite which has exceptional activity and resistance to deactivation when employed in a hydrogen-consuming process. Such processes require a catalyst having both a hydrogenation function and a cracking function. More specifically, the present process uses a dual-function catalytic composite which enables substantial improvements in those hydrotreating processes that have traditionally used a dual-function catalyst. The catalytic composite constitutes a porous carrier material, a Group VIII noble metal component and a tin component for improved activity, product selectivity and operational stability characteristics.

Catalytic composites are used to promote a wide variety of hydrocarbon conversion reactions such as hydrocracking, isomerization, dehydrogenation, hydrogenation, desulfurization, reforming, ring-opening, cyclization, aromatization, alkylation and transalkylation, polymerization, cracking, etc., some of which reactions are hydrogen-producing while others are hydrogen-consuming. It is to the latter group of reactions, hydrogen-consuming, that the present invention is applicable. In many instances, the commercial application of these catalysts is in processes where more than one of these reactions proceed simultaneously. An example of this type of process would be the conversion of aromatic hydrocarbons into jet fuel components, principally straight, or slightly branched paraffins, where both ring-opening and hydrogenation are effected.

Regardless of the reaction involved, or the particular process, it is very important that the catalyst exhibit not only the capability to perform its specified functions initially, but also perform them satisfactorily for prolonged periods of time. The analytical terms employed in the art to measure how efficient a particular catalyst performs its intended functions in a particular hydrocarbon conversion process, are activity, selectivity and stability. For the purposes of discussion, these terms are conveniently defined herein, for a given charge stock, as follows:

(1) activity is a measure of the ability of the catalyst to convert a hydrocarbon feed stock into products at a specified severity level, where severity level alludes to the operating conditions employed — the temperature, pressure, liquid hourly space velocity and hydrogen concentration; (2) selectivity refers to the weight percent or volume percent of the reactants that are converted into the desired product and/or products; (3) stability connotes the rate of change of the activity and selectivity parameters with time — obviously, the smaller rate implying the more stable catalyst. With respect to a hydrogen-consuming process, for example desulfurization, activity, stability and selectivity are similarly defined. Thus, "activity" connotes the quantity of sulfurous compounds converted into hydrogen sulfide and hydrocarbons. "Selectivity" refers to the quantity of charge stock which has been cracked to produce normally gaseous light paraffins. "Stability" connotes the rate of change of activity and selectivity.

As is well known to those skilled in the art, the principal cause of observed deactivation or instability of a dual-function catalyst is associated with the fact that coke forms on the surface of the catalyst during the course of the reaction. More specifically, in the various hydrocarbon conversion processes, and especially those which are categorized as hydrogen-consuming, the conditions utilized result in the formation of high molecular weight, black, solid or semi-solid, hydrogen-poor carbonaceous material which coats the surface of the catalyst and reduces its activity by shielding its active sites from the reactants. Accordingly, a major problem facing workers in this area is the development of more active and selective catalytic composites that are not as sensitive to the presence of thse carbonaceous materials and/or have the capability to suppress the rate of formation of these materials at the operating conditions employed in a particular process.

I have now found a dual-function catalytic composite which possesses improved activity, selectivity and stability when employed in the hydrotreating of hydrocarbons, especially wherein there is effected a chemical consumption of hydrogen. In particular, I have found that the use of a catalytic composite of a Group VIII noble metal component and a tin component with a porous carrier material improves the overall operation of these hydrogen-consuming processes. As indicated, the present invention essentially involves the use of acatalyst in which a tin component has been added to a dual-function conversion catalyst, and enables the performance characteristics of the process to be sharply and materially improved.

OBJECTS AND EMBODIMENTS

An object of the present invention is to afford a process for the hydrotreating of a hydrocarbon, or mixtures of hydrocarbons. A corollary objective is to improve the selectivity and stability of hydrotreating processes utilizing a highly active, tin component-containing catalytic composite.

A specific object of my invention resides in the improvement of hydrogen-consuming processes including hydrorefining, ring-opening for jet fuel production, hydrogenation, desulfurization, denitrification, etc. Therefore, in one embodiment, the present invention encompasses a process for hydrotreating a hydrocarbonaceous charge stock containing sulfurous compounds and aromatic hydrocarbons which comprises reacting said charge stock with hydrogen, at hydrotreating conditions selected to effect chemical consumption of hydrogen, and in contact with a catalytic composite of a Group VIII noble metal component and a tin component combined with a porous carrier material. In another embodiment, the process is further characterized in that the catalytic composite is reduced and sulfided prior to contacting the hydrocarbon feed stream. In still another embodiment, my invention involves a process for hydrogenating a coke-forming hydrocarbon distillate containing di-olefinic and mono-olefinic hydrocarbons, and aromatics, which process comprises reacting said distillate with hydrogen, at a temperature below about 500° F., in contact with a catalytic composite of an alumina-containing refractory inorganic oxide, a Group VIII noble metal component, an alkalinous metal component and a tin component, and recovering an aromatic/mono-olefinic hydrocarbon concentrate substantially free from conjugated di-olefinic hydrocarbons.

Other objects and embodiments of my invention relate to additional details regarding preferred catalytic ingredients, the concentration of components in the catalytic composite, methods of catalyst preparation, individual operating conditions for use in the various hydrotreating processes, preferred processing techniques and the like particulars which are hereinafter given in the following more detailed summary of my invention.

SUMMARY OF INVENTION

As hereinabove set forth, the present invention involves the hydrotreating of hydrocarbons and mixtures of hydrocarbons, for hydrogenation and/or contaminant removal, utilizing a particular catalytic composite. This catalyst comprises a porous carrier material having combined therewith a Group VIII noble metal component and a tin component; in many applications, the catalytic composite will also contain a halogen component, and in some select applications, an alkali metal or alkaline-earth metal component. Considering first the porous carrier material, it is preferred that it be a porous, adsorptive, high-surface area support having a surface area of about 25 to about 500 square meters per gram. It is intended to include carrier materials which have traditionally been utilized in dual-function hydrocarbon conversion catalysts. In particular, suitable carrier materials are selected from the group of amorphous refractory inorganic oxides including alumina, titania, zirconia, chromia, magnesia, thoria, boria, silica-alumina, silica-magnesia, chromia-alumina, alumina-boria, alumina-silica-boron phosphate, silica-zirconia, etc. When of the amorphous type, the preferred carrier material is either a composite of alumina and silica, with silica being present in an amount of about 10.0 percent to about 90.0 percent by weight, or alumina in and of itself.

In many hydrotreating applications of the present invention, the carrier material will constitute a crystalline aluminosilicate, often referred to as being zeolitic in nature. This may be naturally-occurring, or synthetically-prepared, and includes mordenite, faujasite, Type A or Type U molecular sieves, etc. When utilized as the carrier material, the zeolitic material may be in the hydrogen form, or in a form which has been treated with multi-valent cations.

As hereinabove set forth, the porous carrier material, for use in the process of the present invention, is a refractory inorganic oxide, either alumina in and of itself, or in combination with one or more other refractory inorganic oxides, and particularly in combination with silica. When utilized as the sole component of the carrier material, the alumina may be of the gamma-, eta-, or theta-alumina type, with gamma-, or eta-alumina giving the best results. In addition, the preferred carrier materials have an apparent bulk density of about 0.30 to about 0.70 grams per cc. and surface area characteristics such that the average pore diameter is about 20 to about 300 Angstroms, the pore volume is about 0.10 to about 1.0 milliliters per gram and the surface area is about 100 to about 500 square meters per gram. The carrier material may be prepared in any suitable manner and may be synthetically-prepared or naturally-occurring. Whatever type of refractory inorganic oxide is employed, it may be activated prior to use by one or more treatments including drying, calcination, steaming, etc. For example, the alumina carrier may be prepared by adding a suitable alkaline reagent, such as ammonium hydroxide, to a salt of aluminum, such as aluminum chloride, aluminum nitrate, etc. in an amount to form an aluminum hydroxide gel which, upon drying and calcination is converted to alumina. The carrier material may be formed in any desired shape such as spheres, pills, cakes, extrudates, powders, granules, etc., and may further be utilized in any desired size.

When a crystalline aluminosilicate, or zeolitic material, is intended for use as the carrier, it may be prepared in a number of ways. One common way is to mix solutions of sodium silicate, or colloidal silica, and sodium aluminate, and allow these solutions to react to form a solid crystalline aluminosilicate. Another method is to contact a solid inorganic oxide, from the group of silica, alumina, and mixtures thereof, with an aqueous treating solution containing alkali metal cations (preferably sodium) and anions selected from the group of hydroxyl, silicate and aluminate, and allow the solid-liquid mixture to react until the desired crystalline aluminosilicate has been formed. One particular method is especially preferred when the carrier material is intended to be a crystalline aluminosilicate. This stems from the fact that the method produces a carrier material of substantially pure crystalline aluminosilicate particles. In employing the term "substantially pure," the intended connotation is an aggregate particle at least 90.0 percent by weight of which is zeolitic. Thus, the carrier is distinguished from an amorphous carrier material, or prior art pills and/or extrudates in which the zeolitic material might be dispersed within an amorphous matrix with the result that only about 40.0 percent to about 70.0 percent by weight of the final particle is zeolitic. The preferred method of preparing the carrier material produces crystalline aluminosilicates of the faujasite modification, and utilizes aqueous solutions of colloidal silica and sodium aluminate.

An essential constituent of the catalytic composite used in the hydrotreating schemes of the present invention is a tin component. This component may be present as an elemental metal or as a chemical compound such as the oxide, sulfide, halide, etc. This component may be incorporated in the catalytic composite in any suitable manner such as by co-precipitation or co-gellation with the porous carrier material, ion-exchange with the carrier material or impregnation of the carrier material at any stage in the preparation. One method involves co-precipitating the tin component during the preparation of the refractory oxide carrier material. This involves the addition of suitable soluble tin compounds, such as stannous or stannic halide, to the hydrosol, and then combining the hydrosol with a suitable gelling agent, and dropping the resulting mixture into an oil bath. Following the calcination step, there is obtained a carrier material comprising an intimate combination of the refractory inorganic oxide and stannic oxide. Another method of incorporating the tin component involves the utilization of a water-soluble compound of tin to impregnate the porous carrier material. Thus, the tin component may be added to the carrier material by commingling the latter with an aqueous solution of a suitable tin salt or water-soluble compound of tin such as stannous bromide, stannous chloride, stannic chloride pentahydrate, stannic chloride tetrahydrate, stannic chloride trihydrate, stannic chloride diamine, stannic trichloride bromide, stannic chromate, stannous fluoride, stannic fluoride, stannic iodide, stannic sulfate, stannic tartrate, and similar compounds. The utilization of a tin chloride compound, such as stannous or stannic chloride, is preferred since it facilitates the incorporation of both the tin component and at least a minor amount of the halogen component in a single step. In general, the tin component can be impregnated either prior to, simultaneously with, or after the Group VIII noble metal component is added to the carrier material. It appears, however, that significantly improved processing results are obtained when the tin component is impregnated simultaneously with the Group VIII noble metal component. It has been determined that a preferred impregnation solution contains chloroplatinic acid, hydrogen chloride, and stannous or stannic chloride. Regardless of the details of how the components of the catalyst are combined with the carrier material, the final composite will generally be dried at a temperature of about 200° F. to about 600° F., for a period of from about 2 to about 24 hours or more, and finally calcined at a temperature of about 700° F. to about 1,100° F. in an atmosphere of air, for a period of about 0.5 to about 10 hours in order to convert the metallic components substantially to the oxide form.

As previously indicated, the catalyst for use in the process of the present invention also contains a Group VIII noble metal component. Although the process of the present invention is specifically directed to the use of a catalytic composite containing platinum, it is intended to include other Group VIII noble metals such as palladium, rhodium, ruthenium, osmium and iridium. The Group VIII noble metal component, for example platinum, may exist within the final catalytic composite as a compound such as an oxide, sulfide, halide, etc., or in an elemental state. The Group VIII noble metal component generally comprises about 0.01 percent to about 1.0 percent by weight of the final composite, calculated on an elemental basis. Excellent results are obtained when the catalyst contains about 0.3 percent to about 0.9 percent by weight of the platinum group metal. In addition to platinum, another particularly preferred Group VIII noble metal component is palladium, or a compound of palladium.

The Group VIII noble metal component may be incorporated within the catalytic composite in any suitable manner including co-precipitation or co-gellation with the carrier material, ion-exchange, or impregnation. A preferred method of preparation involves the utilization of a water-soluble compound of a Group VIII noble metal component in an impregnation technique. Thus, the platinum component may be added to the carrier material by commingling the latter with an aqueous solution of chloroplatinic acid. Other water-soluble compounds of platinum may be employed, and include ammonium chloroplatinate, platinum chloride, dinitro diamino platinum, etc. The use of a platinum chloride compound, such as chloroplatinic acid, is preferred since it facilitates the incorporation of both the platinum component and at least a minor quantity of the halogen component in a single step. In addition, it is generally preferred to impregnate the carrier material after it has been calcined in order to minimize the risk of washing away the valuable platinum metal compounds; however, in some instances it may be advantageous to impregnate the carrier material when it is in a gelled state. Following impregnation, the impregnated carrier is dried and subjected to a high temperature calcination, or oxidation technique as hereinabove set forth.

Although not essential to successful hydroprocessing in all cases, in fact detrimental in some, a halogen component may be incorporated into the catalytic composite. Accordingly, one catalytic composite, suitable for use in at least one embodiment of the present process, comprises a combination of a Group VIII noble metal component, a tin component and a halogen component. Although the precise form of the chemistry of the association of the halogen component with the carrier material and metallic component is not accurately known, it is customary in the art to refer to the halogen component as being combined with the carrier material, or with the other ingredients of the catalyst. The combined halogen may be either fluorine, chlorine, iodine, bromine, or mixtures thereof. Of these, fluorine and particularly chlorine are preferred for the hydrocarbon hydrotreating processes encompassed by the present invention. The halogen may be added to the carrier material in any suitable manner, and either during preparation of the carrier or before, or after the addition of the other components. For example, the halogen may be added at any stage in the preparation of the carrier material, or to the calcined carrier material, and as an aqueous solution of an acid such as hydrogen fluoride, hydrogen chloride, hydrogen bromide, hydrogen iodide, etc. The halogen component or a portion thereof may be composited with the carrier material during the impregnation of the latter with the Group VIII metal component. The hydrosol, which is typically utilized to form an amorphous carrier material, may contain halogen and thus contribute at least a portion of the halogen component to the final composite. The quantity of halogen is such that the final catalytic composite contains about 0.1 percent to about 1.5 percent by weight, and preferably from about 0.5 percent to about 1.2 percent, calculated on an elemental basis.

With respect to the quantity of the tin component, it is preferably about 0.01 percent to about 5.0 percent by weight, calculated on an elemental basis. Regardless of the absolute quantities of the tin component and the platinum group component, the atomic ratio of the Group VIII noble metal to the tin is preferably selected from the range of about 0.1:1 to about 3:1, with significantly improved results achieved at an atomic ratio of about 0.5:1 to about 1.5:1. This has been found to be particularly true when the total content of the tin component plus the Group VIII noble metal component is fixed in the range of about 0.15 percent to about 2.0 percent by weight. Accordingly, examples of suitable catalytic composites, considering only the Group VIII noble metal component and the tin component are as follows: 0.5 percent by weight of tin, 0.75 percent by weight of platinum; 0.1 percent by weight of tin, 0.65 percent by weight of platinum; 0.375 percent by weight of tin, 0.375 percent by weight of platinum; 1.0 percent by weight of tin, 0.5 percent by weight of platinum; 0.25 percent by weight of tin, 0.5 percent by weight of platinum; 0.75 percent by weight of palladium, 0.5 percent by weight of tin; 0.65 percent by weight of palladium, 0.1 percent by weight of tin; 0.375 percent by weight of palladium, 0.375 percent by weight of tin; 0.5 percent by weight of palladium, 1.0 percent by weight of tin; and, 0.5 percent by weight of palladiu, 0.25 percent by weight of tin. When used in many of the hydrogen-consuming processes hereinbefore described, the foregoing quantities of metallic components will be combined with a carrier material of alumina and silica, wherein the silica concentration is 10.0 percent to about 90.0 percent by weight. In those processes wherein the acid function of the catalytic composite must necessarily be attenuated, the metallic components will be combined with a carrier material consisting essentially of alumina. In this latter situation, a halogen component is often not combined with the catalytic composite, and, the inherent acid function of Group VIII noble metals is further attenuated through the addition of from 0.01 percent to about 1.5 percent by weight of an alkalinous metal component.

One such process, in which the acid function of the catalyst employed must necessarily be attenuated, is the process wherein an aromatic hydrocarbon/olefinic hydrocarbon mixture is subjected to hydrogenation to produce a product stream substantially free from conjugated di-olefinic hydrocarbons and rich in aromatics. In order to avoid ring-opening which results in loss of the aromatic hydrocarbons, and to inhibit the formation of polymers, an alkalinous metal component is combined with the catalytic composite in an amount of from 0.01 percent to about 1.5 percent by weight. This component is selected from the group of lithium, sodium, potassium, rubidium, cesium, barium, strontium, calcium, magnesium, beryllium, mixtures of two or more, etc. In general, more advantageous results are achieved through the use of the alkali metal, particularly lithium and/or potassium.

In those instances where a halogen component is utilized in the catalyst, it has been determined that more advantageous results are obtained when the halogen content of the catalyst is adjusted during the calcination step through the inclusion of a halogen, or a halogen-containing compound in the air atmosphere. In particular, when the halogen component of the catalyst is chlorine, for example, it is preferred to use a mole ratio of water to hydrochloric acid of about 20:1 to about 100:1 during at least a portion of the calcination step in order to adjust the final chlorine content of the composite to a range of about 0.5 percent to about 1.2 percent by weight.

Prior to its use, the resultant calcined catalytic composite may be subjected to a substantially water-free reduction technique. This technique is designed to insure a uniform and finely-divided dispersion of the metallic components throughout the carrier material. Preferably, substantially pure and dry hydrogen (i.e., less than about 30.0 vol. ppm. of water) is employed as the reducing agent. The calcined catalyst is contacted at a temperature of about 800° F. to about 1,200° F., and for a period of time of about 0.5 to about 10 hours, or more, and effected to substantially reduce the metallic components. This reduction technique may be performed in situ as part of a start-up sequence provided precautions are observed to pre-dry the unit to a substantially water-free state.

Again, with respect to effecting hydrogen-consuming reactions, the process may be improved when the reduced composite is subjected to a presulfiding operation designed to incorporate from about 0.05 percent to about 0.50 percent by weight of sulfur, on an elemental basis, in the catalytic composite. This presulfiding treatment takes place in the presence of hydrogen and a suitable sulfur-containing compound including hydrogen sulfide, lower molecular weight mercaptans, organic sulfides, etc. The procedure constitutes treating the reduced catalyst with a sulfide gas, such as a mixture of hydrogen and hydrogen sulfide having about 10 moles of hydrogen per mole of hydrogen sulfide, and at conditions sufficient to effect the desired incorporation of sulfur. These conditions include a temperature ranging from about 50° F. up to about 1,100° F.

According to the present invention, a hydrocarbon charge stock and hydrogen are contacted with a catalyst of the type described above in a hydrocarbon conversion or reaction zone. As hereinafter indicated in greater detail, the particular catalyst employed is dependent upon the characteristics of the charge stock as well as the desired end result. The contacting may be accomplished by using the catalyst in a fixed-bed system, a moving-bed system, a fluidized-bed system, or in a batch-type operation; however, in view of the risk of attrition losses of the valuable catalyst, it is preferred to use the fixed-bed system. Furthermore, it is well known that a fixed-bed catalytic system offers many operational advantages. In this type of system, a hydrogenrich gas and the charge stock are preheated by any suitable heating means to the desired temperature, and then are passed into a conversion zone containing a fixed-bed of the catalytic composite. It is understood, of course, that the conversion zone may be one or more separate reactors having suitable means therebetween to insure that the desired conversion temperature is maintained at the entrance to each reactor. It is also to be noted that the reactants may be contacted with the catalyst bed in either upward, downward, or radial flow fashion, with the latter being preferred. Additionally, the reactants may be in the liquid phase, a mixed liquid-vapor phase, or a vapor phase when they contact the catalyst.

The operating conditions imposed upon the reaction zones are dependent upon the particular hydrotreating process being effected. However, these operating conditions will include a pressure from about 400 to about 5,000 psig., a liquid hourly space velocity of about 0.1 to about 10.0, and a hydrogen concentration within the range of about 1,000 to about 50,000 standard cubic feet per barrel. In view of the fact that the reactions being effected are exothermic in nature, an increasing temperature gradient is experienced as the hydrogen and feed stock traverses the catalyst bed. For any given hydrogen-consuming process, it is desirable to maintain the maximum catalyst bed temperature below about 900° F., which temperature is virtually identical to that as conveniently measured at the outlet of the reaction zone. Hydrogen-consuming processes are conducted at a temperature in the range of about 200° F. to about 900° F., and it is intended herein that the stated temperature of operation alludes to the maximum catalyst bed temperature. In order to assure that the catalyst bed temperature does not exceed the maximum allowed for a given process, the use of conventional quench streams, either normally liquid or gaseous, introduced at one or more intermediate loci of the catalyst bed, is contemplated. In some of the hydrotreating processes encompassed by the present invention a portion of the normally liquid product may be recycled to combine with the fresh hydrocarbon charge stock. In these situations, the combined liquid feed ratio (defined as volumes of total liquid charge to the reaction zone per volume of fresh feed charge to the reaction zone) will be within the range of about 1.1 to about 5.0.

Specific operating conditions, processing techniques, particular catalytic composites and other individual process details will be given in the following detailed description of several of the hydrocarbon hydrotreating processes to which the present invention is applicable. These will be presented by way of examples given in conjunction with commercially-scaled operating units. In presenting these examples, it is not intended that the invention be limited to the specific illustrations, nor is it intended that a given process be limited to the particular operating conditions, catalytic composite, processing techniques, charge stock, etc. It is understood, therefore, that the present invention is merely illustrated by the specifics hereinafter set forth.

EXAMPLE I

One hydrocarbon hydrotreating scheme, to which the present invention is applicable, involves the hydrorefining of coke-forming naptha boiling range hydrocarbon distillates. These hydrocarbon distillates are generally sulfurous in nature, and contain mono-olefinic, di-olefinic and aromatic hydrocarbons. Through the utilization of a catalytic composite comprising both a tin component and a Group VIII noble metal component, increased selectivity and stability of operation is obtained; selectivity is most noticeable with respect to the retention of aromatics, and in hydrogenating conjugated di-olefinic and mono-olefinic hydrocarbons. Such charge stocks generally result from diverse conversion processes including the catalytic and/or thermal cracking or petroleum, sometimes referred to as pyrolysis, the destructive distillation of wood or coal, shale oil retorting, etc. The impurities in these distillate fractions must necessarily be removed before the distillates are suitable for their intended use, or which, when removed, enhance the value of the distillate fraction for further processing. Frequently, it is intended that these charge stocks be substantially desulfurized, saturated to the extent necessary to remove the conjugated di-olefins, while simultaneously retaining the aromatic hydrocarbons. When subjected to hydrorefining for the purpose of removing the contaminating influences, there is encountered difficulty in effecting the desired degree of reaction due to the formation of coke and other carbonaceous material.

As utilized herein, "hydrogenating" is intended to be synonymous with "hydrorefining". The purpose is to provide a highly selective and stable process for hydrogenating coke-forming hydrocarbon distillates, and this is accomplished through the use of a fixed-bed catalytic reaction system utilizing a catalyst comprising a tin component and a Group VIII noble metal component. There exists two separate, desirable routes for the treatment of coke-forming distillates, for example a pyrolysis naptha by-product. One such route is directed toward a product suitable for use in certain gasoline blending. With this as the desired object, the process can be effected in a single stage, or reaction zone, with the catalytic composite hereinafter specifically described as the first-stage catalyst. The attainable selectivity in this instance resides primarily in the hydrogenation of highly reactive double bonds. In the case of conjugated di-olefins, the selectivity afforded restricts the hydrogenation to produce mono-olefins, and, with respect to the styrenes, for example, the hydrogenation is inhibited to produce alkyl benzenes without "ring" saturation. The selectivity is accomplished with a minimum of polymer formation either to "gums", or polymers of lower molecular weight which would necessitate a re-running of the product before blending to gasoline would be feasible. Other advantages of restricting the hydrogenating of the conjugated diolefins and styrenes include: lower hydrogen consumption, lower heat of reaction and a higher octane rating gasoline boiling range product effluent. Also, the non-conjugated di-olefins, such as 1,5 normal hexadiene are not unusually offensive in suitably inhibited gasolines in some locales, and will not react in this first stage. Some fresh charge stocks are sufficiently low in mercaptan sulfur content that direct gasoline blending may be considered, although a mild treatment for mercaptan sulfur removal might be necessary. Such considerations are generally applicable to foreign markets, particularly European, where olefinic and sulfur-containing gasolines are not too objectionable. It must be noted that the sulfurous compounds, and the mono-olefins, whether virgin or products or di-olefin partial saturation, are unchanged in the single, or first-stage reaction zone. Where however the desired end result is aromatic hydrocarbon retention, intended for subsequent extraction, the two-stage route is required. The mono-olefins must be substantially saturated in the second stage to facilitate aromatic extraction by way of currently utilized methods. Thus, the desired necessary hydrogenation involves saturation of the mono-olefins, as well as sulfur removal, the latter required for an acceptable ultimate aromatic product. Attendant upon this is the necessity to avoid even partial saturation or ring-opening of aromatic nuclei.

With respect to one catalytic composite, its principal function involves the selective hydrogenation of conjugated di-olefinic hydrocarbons to mono-olefinic hydrocarbons. This particular catalytic composite possesses unusual stability notwithstanding the presence of relatively large quantities of sulfurous compounds in the fresh charge stock. The catalytic composite comprises an alumina-containing refractory inorganic oxide, a tin component, a Group VIII noble metal component and an alkalinous metal component, the latter being preferably potassium and/or lithium. It is especially preferred, for use in this particular hydrocarbon hydroprocessing scheme, that the catalytic composite be substantially free from any "acid-acting" propensities. The catalytic composite, utilized in the second reaction zone for the primary purpose of effecting the destructive conversion of sulfurous compounds into hydrogen sulfide and hydrocarbons, is a composite of an alumina-containing refractory inorganic oxide, a Group VIII noble metal component and a tin component. Through the utilization of a particular sequence of processing steps, and the use of the foregoing described catalytic composites, the formation of high molecular weight polymers and co-polymers is inhibited to a degree which permits processing for an extended period of time. Briefly, this is accomplished by initiating the hydrorefining reactions at a temperature below about 500° F., at which temperature coke-forming reactions are not promoted. The operating conditions within the second reaction zone are such that the sulfurous compounds are removed without incurring the detrimental polymerization reactions otherwise resulting were it not for the saturation of the conjugated diolefinic hydrocarbons within the first reaction zone.

The hydrocarbon distillate charge stock, for example a light naphtha by-product from a commercial cracking unit designed and operated for the production of ethylene, having a gravity of about 40.0° API, a bromine number of about 45.7, a diene value of about 35.1 and containing about 400 ppm. by weight of sulfur and 73.0 vol. percent aromatic hydrocarbons, is admixed with recycled hydrogen. The hydrogen concentration is within the range of from about 1,000 to about 10,000 scf./Bbl., and preferably in the narrower range of from 1,500 to about 6,000 scf./Bbl. The charge stock is heated to a temperaure such that the maximum catalyst temperature is in the range of from about 200° F. to about 500° F., by way of heat-exchange with various product effluent streams, and is introduced into the first reaction zone at a LHSV in the range of about 0.5 to about 10.0. The reaction zone is maintained at a pressure of from 400 to about 1,000 psig., and preferably at a level in the range of from 500 psig. to about 900 psig.

The temperature of the product effluent from the first reaction zone is increased to a level above about 500° F., and preferably to result in a catalyst temperature in the range of 600° F. to 900° F. When the process is functioning efficiently, the diene value of the liquid charge entering the second catalytic reaction zone is less than about 1.0 and often less than about 0.5. The conversion of nitrogenous and sulfurous compounds, and the saturation of mono-olefins, contained within the first zone effluent, is effected in the second zone. The second catalytic reaction zone is maintained under an imposed pressure of from about 400 to about 1,000 psig., and preferably at a level of from about 500 to about 900 psig. The two-stage process is facilitated when the focal point for pressure control is the high pressure separator serving to separate the product effluent from the second catalytic reaction zone. It will, therefore, be maintained at a pressure slightly less than the first catalytic reaction zone, as a result of fluid flow through the system. The LHSV through the second reaction zone is about 0.5 to about 10.0, based upon fresh feed only. The hydrogen concentration will be in a range of from 1,000 to about 10,000 scf./Bbl., and preferably from about 1,000 to about 8,000 scf./Bbl. Series-flow through the entire system is facilitated when the recycle hydrogen is admixed with the fresh hydrocarbon charge stock. Make-up hydrogen, to supplant that consumed in the overall process, may be introduced from any suitable external source, but is preferably introduced into the system by way of the effluent line from the first catalytic reaction zone to the second catalytic reaction zone.

With respect to the naphtha boiling range portion of the product effluent, the sulfur concentration is less than about 1.0 ppm., the aromatic concentration is about 72.2 percent by volume, the bromine number is less than about 0.5 and the diene value is essentially "nil."

With charge stocks having exceedingly high diene values, a recycled diluent is employed in order to prevent an excessive temperature rise in the reaction system. Where so utilized, the source of the diluent is preferably a portion of the normally liquid product effluent from the second catalytic reaction zone. The precise quantity of recycle material varies from feed stock to feed stock; however, the rate at any given time is controlled by monitoring the diene value of the combined liquid feed to the first reaction zone. As the diene value exceeds a level of about 25.0, the quantity of recycle is increased, thereby increasing the combined liquid feed ratio; when the diene value approaches a level of about 20.0, or less, the quantity of recycle may be lessened, thereby decreasing the combined liquid feed ratio.

With another so-called pyrolysis gasoline, having a gravity of about 39.4°API, containing 200 ppm. by weight of sulfur, 76.0 percent by volume of aromatics, and having a bromine number of 50 and a diene value of 30, it is initially processed in a first reaction zone containing a catalytic composite of alumina, 0.5 percent by weight of lithium, 0.375 percent by weight of palladium and 0.20 percent by weight of tin, calculated as the elements. The fresh feed charge rate is 3,370 Bbl./day, and this is admixed with 1,685 Bbl./day of a normally liquid diluent. Based upon fresh feed only, the LHSV is 2.6 and the hydrogen circulation rate is 1,500 scf./Bbl. The charge is raised to a temperature of about 260° F., and enters the first reaction zone at a pressure of about 825 psig. The product effluent emanates from the first reaction zone at a pressure of about 815 psig. and a temperature of about 320° F. The temperature of the first reaction zone effluent is increased to a level of about 620° F., and is introduced into the second reaction zone under a pressure of about 800 psig. The LHSV, exclusive of the recycle diluent, is 2.6, and the hydrogen circulation rate is about 2,250 scf./Bbl. The second reaction zone contains a catalyst of a composite of alumina, 0.375 percent by weight of platinum and 0.20 percent by weight of tin. The reaction product effluent is introduced, following its use as a heat-exchange medium and further cooling, to reduce its temperature to a level of 110° F., into a high-pressure separator at a pressure of about 750 psig. The normally liquid stream from the cold separator is introduced into a reboiled stripping column for hydrogen sulfide removal and depentanization. The hydrogen sulfide stripping column functions at conditions of temperature and pressure required to concentrate a $C_6$ to $C_9$ aromatic stream as a bottoms fraction. With respect to the overall product distribution, only 0.03 percent by weight of the charge results in light paraffinic hydrocarbons, 0.01 percent by weight of butanes and 0.02 percent by weight of pentanes. The aromatic concentrate is recovered in an amount of about 100.91 percent by weight; these results are achieved with a hydrogen consumption of only 540 scf./Bbl., or 0.99 percent by weight. With respect to the aromatic concentrate, the gravity is 43.0°API, the aromatic concentration is 76.0, the sulfur concentration is less than 1.0 ppm. by weight, and the diene value is essentially "nil."

EXAMPLE II

This example is presented to illustrate still another hydrocarbon hydroprocessing scheme for the improvement of the jet fuel characteristics of sulfurous kerosene boiling range fractions. The improvement is especially noticeable in the IPT Smoke Point, the concentration of aromatic hydrocarbons and the concentration of sulfur. A two-stage process wherein desulfurization is effected in the first reaction zone at relatively mild severities which result in a normally liquid product effluent containing from about 15 to about 35 ppm. of sulfur by weight. Aromatic saturation is the principal reaction effected in the second reaction zone, having disposed therein a catalytic composite of alumina, a halogen component, a Group VIII noble metal component and a tin component.

Suitable charge stocks are kerosene fractions having an initial boiling point as low as about 300° F., and an end boiling point as high as about 575° F., and, in some instances, up to 600° F. Exemplary of such kerosene fractions are those boiling from about 300° F. to about 550° F., from 330° F. to about 500° F., from 330° F. to about 530° F., etc. As a specific example, a kerosene obtained from hydrocracking a Mid-continent slurry oil, having a gravity of about 30.5°API, an initial boiling point of about 388° F., an end boiling point of about 522° F., has an IPT Smoke Point of 17.1 mm., and contains 530 ppm. of sulfur and 24.8 percent by volume of aromatic hydrocarbons. Through the use of the catalytic process of the present invention, the improvement in the jet fuel quality of such a kerosene fraction is most significant with respect to raising the IPT Smoke Point, and reducing the concentration of sulfur and the quantity of aromatic hydrocarbons. Specifications regarding the poorest quality of jet fuel, commonly referred to as Jet-A, Jet A1 and Jet-B call for a sulfur concentration of about 0.3 percent by weight maximum (3,000 ppm.), a minimum IPT Smoke Point of 25 mm. and a maximum aromatic concentration of about 20.0 vol. percent.

The charge stock is admixed with recycled hydrogen in an amount within the range of from about 1,000 to about 2,000 scf./Bbl. This mixture is heated to a temperature level necessary to control the maximum catalyst bed temperature below about 750° F., and preferably not above 700° F., with a lower catalyst bed temperature of about 600° F. The catalyst, a well known desulfurization catalyst containing about 2.2 percent by weight of cobalt and about 5.7 percent by weight of molybdenum, composited with alumina is disposed in a reaction zone maintained under an imposed pressure in the range of from about 500 to about 1,100 psig. The LHSV is in the range of about 0.5 to about 10.0, and preferably from about 0.5 to about 5.0. The total product effluent from this first catalytic reaction zone is separated to provide a hydrogen-rich gaseous phase and a normally liquid hydrocarbon stream containing 15 ppm. to about 35 ppm. of sulfur by weight. The normally liquid phase portion of the first reaction zone effluent is utilized as the fresh feed charge stock to the second reaction zone. In this particular instance, the first reaction zone decreases the sulfur concentration to about 25 ppm., the aromatic concentration to about 16.3 percent by volume, and has increased the IPT Smoke Point to a level of about 21.5 mm.

The catalytic composite within the second reaction zone comprises alumina, 0.30 percent by weght of platinum, 0.25 percent by weight of tin and about 0.70 percent by weight of combined chloride, calculated on the basis of the elements. The reaction zone is maintained at a pressure of about 400 to about 1,500 psig., and the hydrogen circulation rate is in the range of 1,500 to about 10,000 scf./Bbl. The LHSV, hereinbefore defined, is in the range of from about 0.5 to about 5.0, and preferably from about 0.5 to about 3.0. It is preferred to limit the catalyst bed temperature in the second reaction zone to a maximum level of about 750° F. With a catalyst of this particular chemical and physical characteristics, optimum aromatic saturation, processing a feed stock containing from about 15 to about 35 ppm. of sulfur, is effected at maximum catalyst bed temperatures in the range of about 625° F. to about 750° F. With respect to the normally liquid kerosene fraction, recovered from the condensed liquid removed from the total product effluent, the sulfur concentration is effectively "nil", being about 0.1 ppm. The quantity of aromatic hydrocarbons has been decreased to a level of about 1.0 percent by volume, or less, and the IPT Smoke Point has been increased to above 35.0 mm.

With respect to another kerosene fraction, having an IPT Smoke Point of about 22.5 mm., an aromatic concentration of about 17.7 vol. percent and a sulfur concentration of about 22 ppm. by weight, the same is processed in a catalytic reaction zone at a pressure of about 850 psig. and a maximum catalyst bed temperature of about 725° F. The LHSV is about 1.25, and the hydrogen circulation rate is about 6,000 scf./Bbl. The catalytic composite disposed within the reaction zone comprises alumina, 0.375 percent by weight of platinum, 0.35 percent by weight of tin and about 0.70 percent by weight of combined chloride. Following separation and distillation, to concentrate the kerosene fraction, analyses indicate that the Smoke Point has been increased to a level of about 35.3 mm., the aromatic concentration has been lowered to about 0.9 percent by volume and the sulfur concentration is essentially "nil."

The foregoing specification, and particularly the examples, indicates the method by which the present invention is effected, and the benefits afforded through the utilization thereof.

I claim as my invention:

1. A two-stage process for hydrotreating a coke-forming hydrocarbon distillate containing sulfurous compounds, aromatic hydrocarbons and di-olefinic hydrocarbons while retaining aromatic hydrocarbon content which comprises treating said coke-forming distillate by reacting hydrogen therewith in a first stage reaction zone in contact with a catalytic composite containing a tin component, a Group VIII noble metal component and an alkalinous metal component combined with a porous carrier material, the total content of the tin component plus the Group VIII noble metal component being fixed in the range of about 0.15 percent to about 2.0 percent by weight, the atomic ratio of Group VIII metal to tin being about 0.1:1 to about 3:1, and the alkalinous metal component being present in an amount of from about 0.01 percent to about 1.5 percent by weight, on an elemental basis, said treatment being effected at conditions including a maximum catalyst bed temperature in the range of from 200° F. to 500° F. to provide an aromatic/mono-olefinic reaction product substantially free from conjugated diolefinic hydrocarbons and; reacting reaction product from said first stage reaction zone in a second stage reaction zone with hydrogen in contact with a catalytic composite containing a tin component and a Group VIII noble metal component, the total content of the tin component plus the Group VIII noble metal component being fixed in the range of about 0.15 percent to about 2.0 percent by weight, and the atomic ratio of group of Group VIII metal to tin being about 0.1:1 to about 3:1, said treatment being effected at conditions including a catalyst bed temperature in the range of from 600° F. to about 900° F; and, separating the reaction product effluent from said second-stage reaction zone to recover an aromatic-rich stream substantially free from sulfurous compounds and mono-olefinic hydrocarbons.

* * * * *